(12) United States Patent
Takahashi et al.

(10) Patent No.: US 7,740,097 B2
(45) Date of Patent: Jun. 22, 2010

(54) HOOD AIRBAG DEVICE FOR USE IN A VEHICLE

(75) Inventors: Hiroyuki Takahashi, Aichi-ken (JP); Takayuki Takimoto, Tokyo (JP)

(73) Assignees: Toyota Jidosha Kabushiki Kaisha, Toyota-shi, Aichi-ken (JP); Takata Corporation, Tokyo (JP)

( * ) Notice: Subject to any disclaimer, the term of this patent is extended or adjusted under 35 U.S.C. 154(b) by 0 days.

(21) Appl. No.: 12/223,252

(22) PCT Filed: Jan. 4, 2007

(86) PCT No.: PCT/IB2007/000013
§ 371 (c)(1),
(2), (4) Date: Jul. 25, 2008

(87) PCT Pub. No.: WO2007/085919
PCT Pub. Date: Aug. 2, 2007

(65) Prior Publication Data
US 2009/0229906 A1    Sep. 17, 2009

(30) Foreign Application Priority Data
Jan. 25, 2006   (JP) .............................. 2006/016508

(51) Int. Cl.
*B60K 28/10* (2006.01)
(52) U.S. Cl. ..................................... 180/274
(58) Field of Classification Search ............. 180/271, 180/274; 280/730.1
See application file for complete search history.

(56) References Cited

U.S. PATENT DOCUMENTS

| | | | |
|---|---|---|---|
| 6,827,170 B2 | 12/2004 | Hamada et al. | |
| 6,857,495 B2 * | 2/2005 | Sawa | 180/274 |
| 6,923,286 B2 * | 8/2005 | Sato et al. | 180/274 |
| 7,211,752 B2 * | 5/2007 | Okamoto et al. | 200/61.58 R |
| 7,341,274 B2 * | 3/2008 | Mori et al. | 280/728.2 |
| 2003/0075373 A1 * | 4/2003 | Sawa et al. | 180/271 |
| 2004/0262894 A1 * | 12/2004 | Kempf | 280/730.1 |
| 2005/0205333 A1 | 9/2005 | Mori et al. | |

(Continued)

FOREIGN PATENT DOCUMENTS

JP    63-82680    5/1988

(Continued)

OTHER PUBLICATIONS

International Search Report.

(Continued)

*Primary Examiner*—Paul N Dickson
*Assistant Examiner*—Robert A Coker
(74) *Attorney, Agent, or Firm*—Finnegan, Henderson, Farabow, Garrett & Dunner, LLP (57) ABSTRACT

A vehicle hood airbag device in which an in-hood reinforcement (28) is arranged in a hood width direction at a rear end portion of an inner hood panel (20). The in-hood reinforcement (28) has longitudinal opposite end portions coupled to left and right hood hinge reinforcements (40) that are disposed on the respective lateral sides of the inner hood-panel (20) to increase the rigidity of the inner hood panel (20). Further, by fixing the airbag case (46) to the in-hood reinforcement (28), the rigidity of the inner hood panel (20) is further increased.

13 Claims, 6 Drawing Sheets

U.S. PATENT DOCUMENTS

2005/0206139 A1* 9/2005 Mori et al. ............... 280/730.1
2006/0042854 A1* 3/2006 Sasaki et al. ............... 180/274

FOREIGN PATENT DOCUMENTS

| JP | 7-125610 | 5/1995 |
| JP | 7-156749 | 6/1995 |
| JP | 8-11662 | 1/1996 |
| JP | 2920284 | 4/1999 |
| JP | 2003-104144 | 4/2003 |
| JP | 2005-262953 | 9/2005 |
| JP | 2005-262955 | 9/2005 |
| JP | 2005-280556 | 10/2005 |

OTHER PUBLICATIONS

Written Opinion of the ISR.
Japanese Office Action dated May 28, 2008.
Office Action (Notice of Grounds for Rejection) from the Korean Patent Office for Appl. No. 10-2008-7018123 dated Sep. 23, 2009.

* cited by examiner

HOOD AIRBAG DEVICE FOR USE IN A VEHICLE

BACKGROUND OF THE INVENTION

1. Field of the Invention

The present invention relates to a hood airbag device that deploys an airbag over a hood of a vehicle when the vehicle collides against an impact object.

2. Background of the Invention

Japanese Patent Application Publication No. JP-A-2005-262955 describes a hood airbag device in which an opening is formed at the rear end portion of an inner hood panel and extends along the lower end portion of the windshield in the lateral direction of a vehicle and an airbag module is mounted through the opening.

The airbag of the above-cited reference has a generally U-shape when viewed from above and generally large enough to cover the bottom area of a front pillar as well as the rear end portion of the hood and the cowl. This requires that the opening formed in the inner hood panel and an in-hood reinforcement should be relatively large. For this reason, the rigidity of the inner hood panel, and potentially the hood, are reduced.

SUMMARY OF THE INVENTION

The present invention provides a hood airbag device that reinforces the rigidity of an inner hood panel with ease when an airbag module is mounted to the hood through an opening formed in the inner hood panel, the opening extending in the lateral direction of a vehicle.

In accordance with an aspect of the present invention, the hood airbag device for use in a vehicle, includes: an airbag case accommodating therein a gas generating unit that discharges a gas when the vehicle collides with an impact object and an airbag adapted to be deployed over the outer hood panel by the gas supplied from the gas generating unit, the airbag case being inserted and mounted in place through a mounting aperture formed in a hood width direction at a rear side of an inner hood panel; and an in-hood reinforcement arranged around the airbag case to reinforce a peripheral portion around the mounting aperture of the inner hood panel and having longitudinal opposite end portions respectively coupled to hood hinge reinforcements disposed on opposite lateral sides of the inner hood panel.

In accordance with the present invention, the gas generating unit discharges gas when the vehicle makes head-on collision with the impact object, such as a pedestrian. The gas thus discharged is supplied into the airbag stored in the airbag case. This allows the airbag to be expanded and deployed over the outer hood panel. As a consequence, the impact object lands on the airbag thus deployed. This ensures that the impact energy at the time of collision is absorbed by the airbag, thus reducing the reaction force of the vehicle applied to the impact object.

In this regard, the airbag case is inserted and mounted in place through the mounting aperture formed at the rear end portion of the inner hood panel, in the hood width direction. This may reduce the rigidity of the inner hood panel around the mounting aperture. For this reason, the in-hood reinforcement is arranged around the airbag case to reinforce the surrounding area, including the peripheral edge portion around the mounting aperture of the inner hood panel. Particularly, in the present aspect, the opposite longitudinal end portions of the in-hood reinforcement are coupled to the left and right hood hinge reinforcements disposed at the opposite lateral sides of the inner hood panel, respectively. Thus, the mass of the airbag case and the functional components accommodated in the airbag case is borne by the hood hinge reinforcements. Moreover, inasmuch as the hood hinge reinforcements are originally arranged on the hood, it is possible to relatively readily provide a reinforcement structure merely by coupling the in-hood reinforcement to the existing hood hinge reinforcements. Therefore, it is possible to assure the rigidity of the inner hood panel with ease.

Preferably, the airbag case may be fixed to the in-hood reinforcement and may have an elongated shape extending in the hood width direction.

In accordance with the above structure, the airbag case, the in-hood reinforcement and the hood hinge reinforcements are united together, thanks to the fact that the elongated airbag case extending in the hood width direction is fixed to the in-hood reinforcement. That is, the airbag case is also used as a reinforcing member, so that the rigidity of the airbag case is effectively utilized. The rigidity of the inner hood panel can be secured without increasing the number of components.

Preferably, a single bag-expansion opening may be formed, at a rear end portion of the outer hood panel, that extends in the hood width direction and the airbag may be a unitary non-divided airbag that is deployed to the outside through the bag-expansion opening.

In accordance with the above structure, the single bag-expansion opening is formed at the rear end portion of the outer hood panel to extend in the hood width direction, and a unitary non-divided airbag is deployed through the bag-expansion opening.

Preferably, left and right bag-expansion openings may be formed at a rear end portion of the outer hood panel and may respectively extend in the hood width direction. The airbag may be divided into left and right airbags that correspond to the left and right bag-expansion openings, each of the left and right airbags may be deployed to the outside through the corresponding left or right bag-expansion opening.

In accordance with the above structure, the left and right bag-expansion openings are formed at a rear end portion of the outer hood panel to respectively extend in the hood width direction, and the mutually-divided left and right airbags are deployed through the left and right bag-expansion openings.

As described above, the reinforcement structure that enhances the rigidity of the hood using the left and right hood hinge reinforcements may also be applied to either the non-divided airbag or the mutually-divided left and right airbags, regardless of the extensive structural differences between such airbags. In other words, the reinforcement structures may be used in conjunction with either type of the airbag. This eliminates the need to change the design of the hood airbag device on a vehicle-by-vehicle basis, which helps to reduce cost.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE INVENTION

Hereinafter, there will be described a hood airbag device 10 for use in a vehicle 12 in accordance with a first preferred embodiment of the present invention with reference to FIGS. 1 to 4. In the drawings, the arrow "FR" designates the front direction of the vehicle, the arrow "UP" denotes the upward direction of the vehicle and the arrow "IN" indicating the inward width direction of the vehicle.

Figure 2:
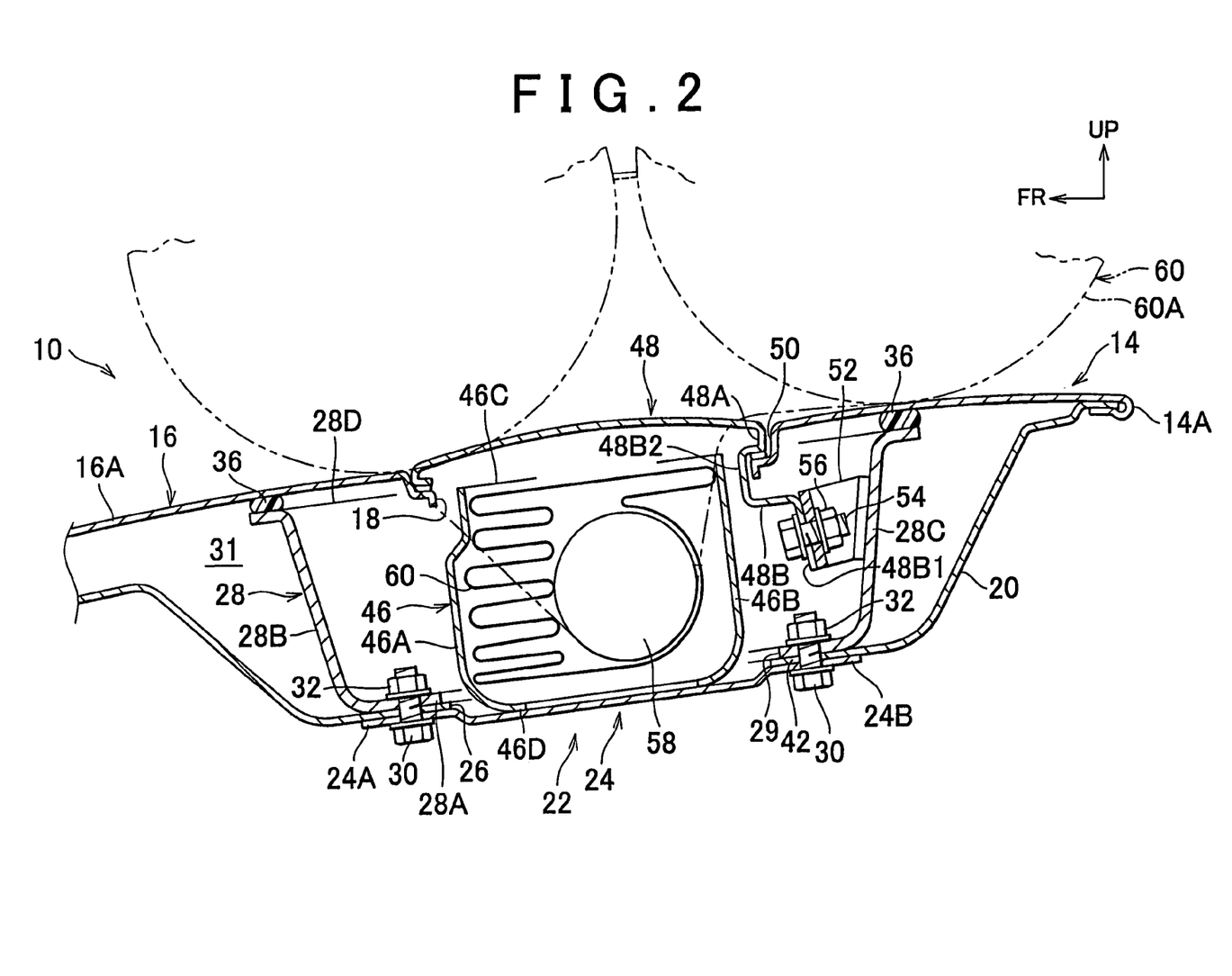
FIG. 2 is a side elevational cross-sectional view taken in the longitudinal direction of a vehicle (along the line 2-2 in FIG. 3), illustrating the hood airbag device of the first embodiment mounted in place.
Figure 3:
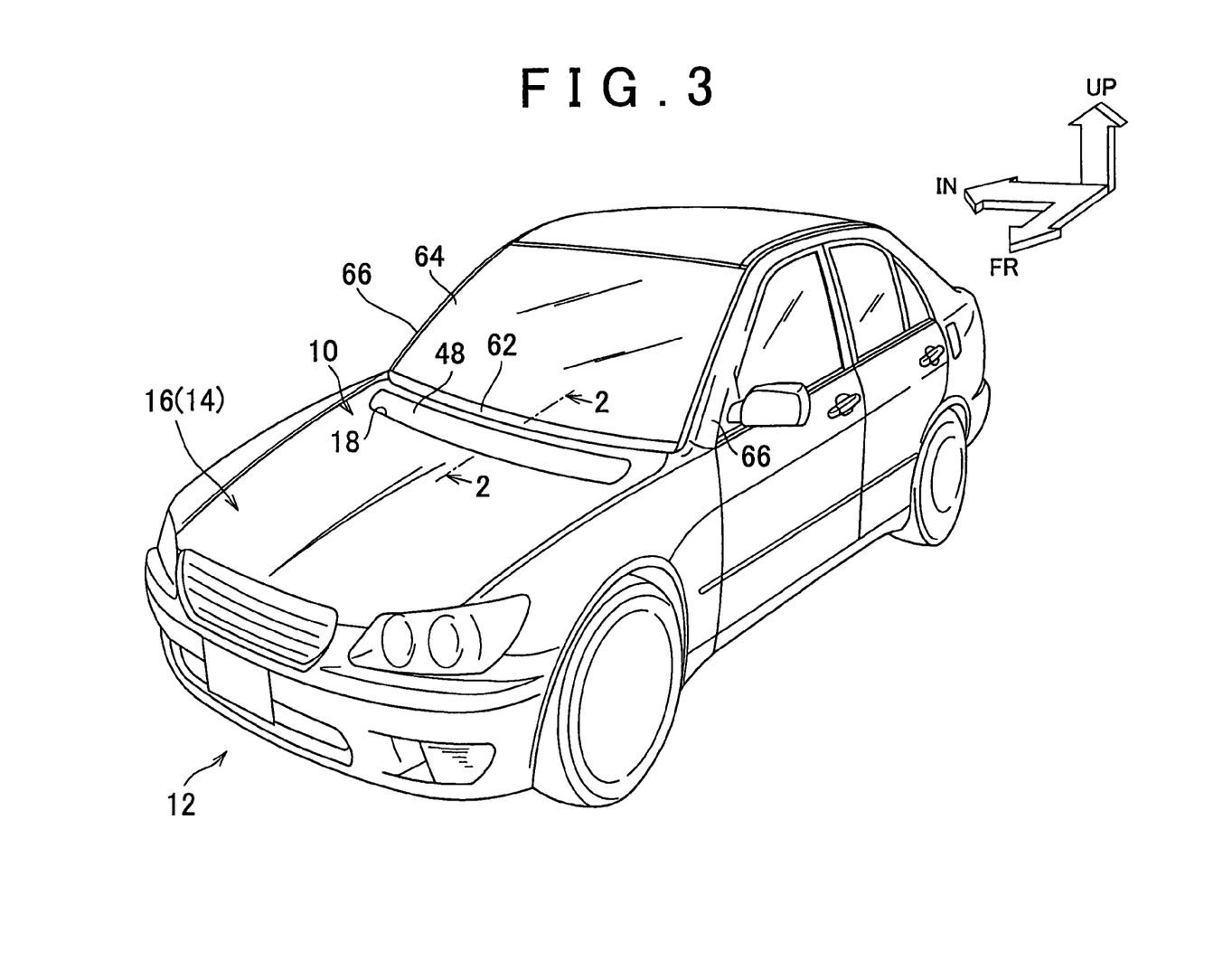
FIG. 3 is a perspective view of the vehicle depicting the hood airbag device of the first embodiment in an inactive state.
Figure 4:
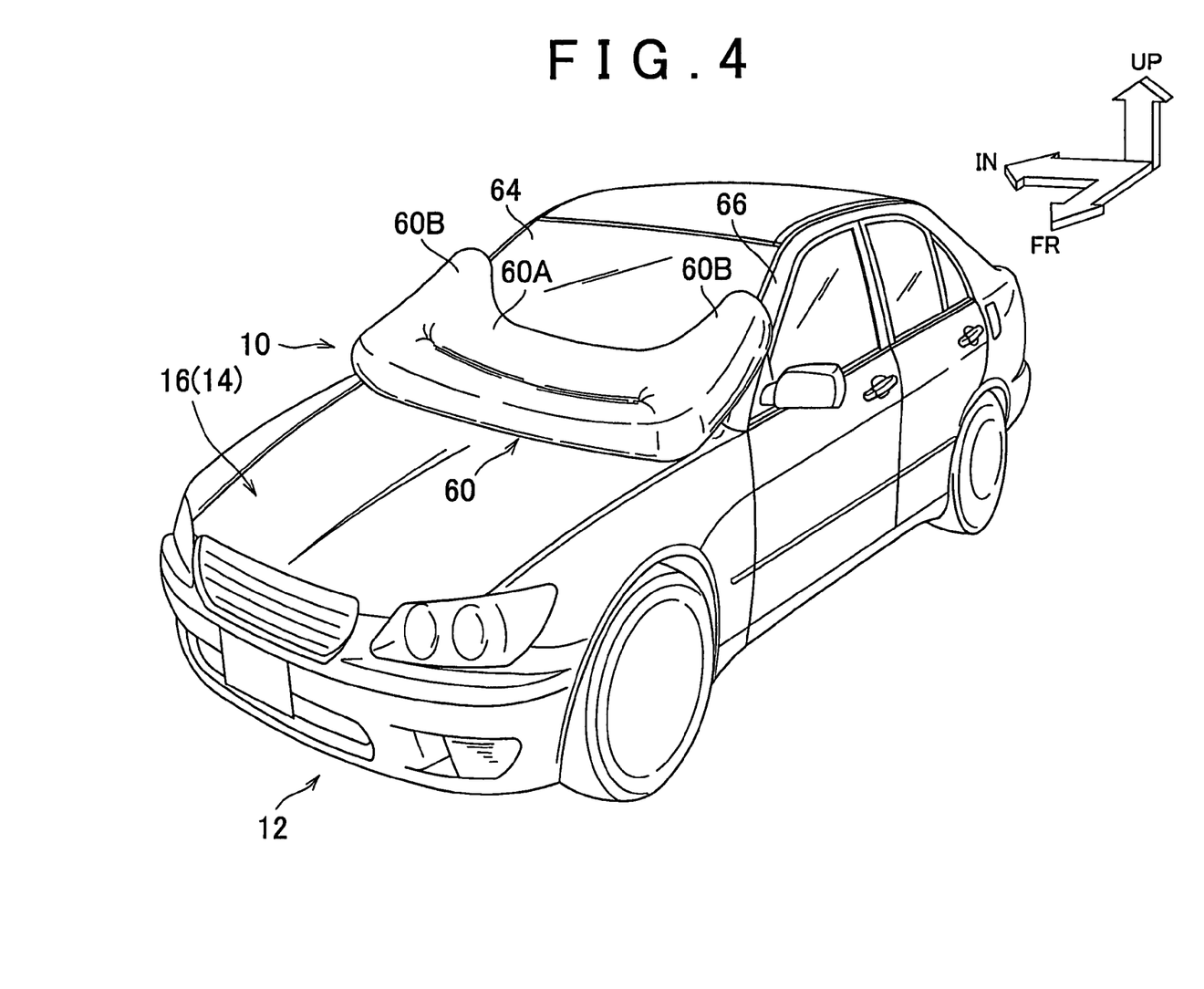
FIG. 4 is a perspective view of the vehicle illustrating the hood airbag device of the first embodiment in an activated state.

FIG. 4 is a perspective view of the vehicle 12 illustrating the hood airbag device 10 in an activated state. FIG. 3 is a perspective view of the vehicle 12 depicting the hood airbag device 10 in an inactive state. FIG. 2 is a side elevational cross-sectional view taken in the longitudinal direction of the vehicle (along the line 2-2 in FIG. 3), illustrating the hood airbag device 10 mounted in place.

As illustrated in FIGS. 1 to 4, the hood airbag device 10 is arranged along the lateral direction of the vehicle at the rear side of a hood 14 that openably closes the engine compartment. The hood 14 includes an outer hood panel 16 that serves as an outer plate and forms a design surface of the hood 14, and an inner hood panel 20 that is underneath and spaced apart from the outer hood panel 16 to form a space 31 therebetween and serves as an inner plate of the hood 14.

Referring to FIG. 3, the outer hood panel 16 is provided at its rear end with an elongated opening 18 through which an airbag is deployed (hereinafter, referred to as "bag-expansion opening"), the opening 18 extending in the lateral direction of the vehicle. The bag-expansion opening 18 is of a generally rectangular shape as viewed from above. As shown in FIG. 2, an internal hood aperture 26, functioning as a mounting opening and having the same shape as the bag-expansion opening 18, is formed in the inner hood panel 20 at a position opposite to the bag-expansion opening 18. The airbag module 22 is attached to the inner hood panel 20 through the internal hood aperture 26.

The airbag module 22 includes a lower plate 24 of high strength, which is larger than the internal hood aperture 26, an airbag case 46 of a generally box-like shape fixed to at the center portion of the top surface of the lower plate 24, an inflator 58 disposed within the airbag case 46 and serving as a gas generating unit, and an airbag 60 accommodated within the an airbag case 46 in a collapsed state. In the following, the respective components of the airbag module 22 will be supplementarily described in the sequence named above.

The lower plate 24 is brought into contact with the inner hood panel 20 from the lower side of the vehicle to close the internal hood aperture 26. The portion of the lower plate 24 corresponding to the internal hood aperture 26 is slightly recessed in the downward direction of the vehicle, the airbag case 46 being attached to the slightly recessed portion.

The airbag case 46 is open at its top and has a front wall 46A, a rear wall 46B, left and right side walls 46C and a bottom wall 46D. The airbag case 46 is made of metal. The airbag case 46 is smaller than the internal hood aperture 26 as viewed from above, so that it can be inserted through the internal hood aperture 26 from below the inner hood panel 20. It should be noted that the airbag case 46 and the lower plate 24 jointly constitute an "airbag case" in the present invention.

The inflator 58 is formed in a generally cylindrical shape and accommodated within the airbag case 46 with its longer side extending in the hood width direction. One inflator 58 may provided on the longitudinal center portion of the airbag case 46 (near the center of the hood), two inflators 58, one on the left and one the right side of the airbag case 46, may disposed in the airbag case 46, or three inflators 58, one on the left and one the right side, and one in the center portion of the airbag case 46, may arranged in the airbag case 46. The inflator 58 is set within the airbag case 46 under the condition that it is accommodated into the airbag 60. The inflator 58 is not necessarily accommodated into the airbag 60 and, alternatively, the inflator 58 may be fixed to the bottom wall 46D of the airbag case 46 or the lower plate 24 through the use of a diffuser or the like. The inflator 58 may be one of a mechanically triggered type and an electrically triggered type. Furthermore, the inflator 58 may be filled with either a gas generating material or a high-pressure gas. A plurality of gas emission holes are formed in prescribed positions on a surrounding wall portion of the inflator 58 along a circumferential direction of the latter.

The airbag 60 is normally accommodated within the airbag case 46 in a collapsed state and, when deployed, has the shape as illustrated in FIG. 4. Specifically, the airbag 60 includes a main body portion 60A having a plurality of cells and capable of being deployed into a flat shape in the lateral direction of the vehicle, and left and right extension portions 60B communicating with the respectively sides of the main body portion 60A and extending toward front pillars 66. In the event that the airbag 60 has been deployed, the rear end portion 14A of the hood 14 and the cowl 62 (and the lower end portion of the windshield 64) are covered by the main body portion 60A and, at the same time, the lower portions of the front pillars 66 are covered by the pair of left and right extension portions 60B.

Referring again to FIGS. 1 and 2, disposed around the airbag case 46 is an in-hood reinforcement 28 of a generally box-like shape that is larger than the airbag case 46. The in-hood reinforcement 28 has a bottom wall portion 28A disposed around the internal hood aperture 26 in a contacting relationship with the inner hood panel 20, a pair of front and rear wall portions 28B and 28C extending upwardly from the front and rear edges of the bottom wall portion 28A, and a pair of left and right side wall portions 28D.

Figure 1:
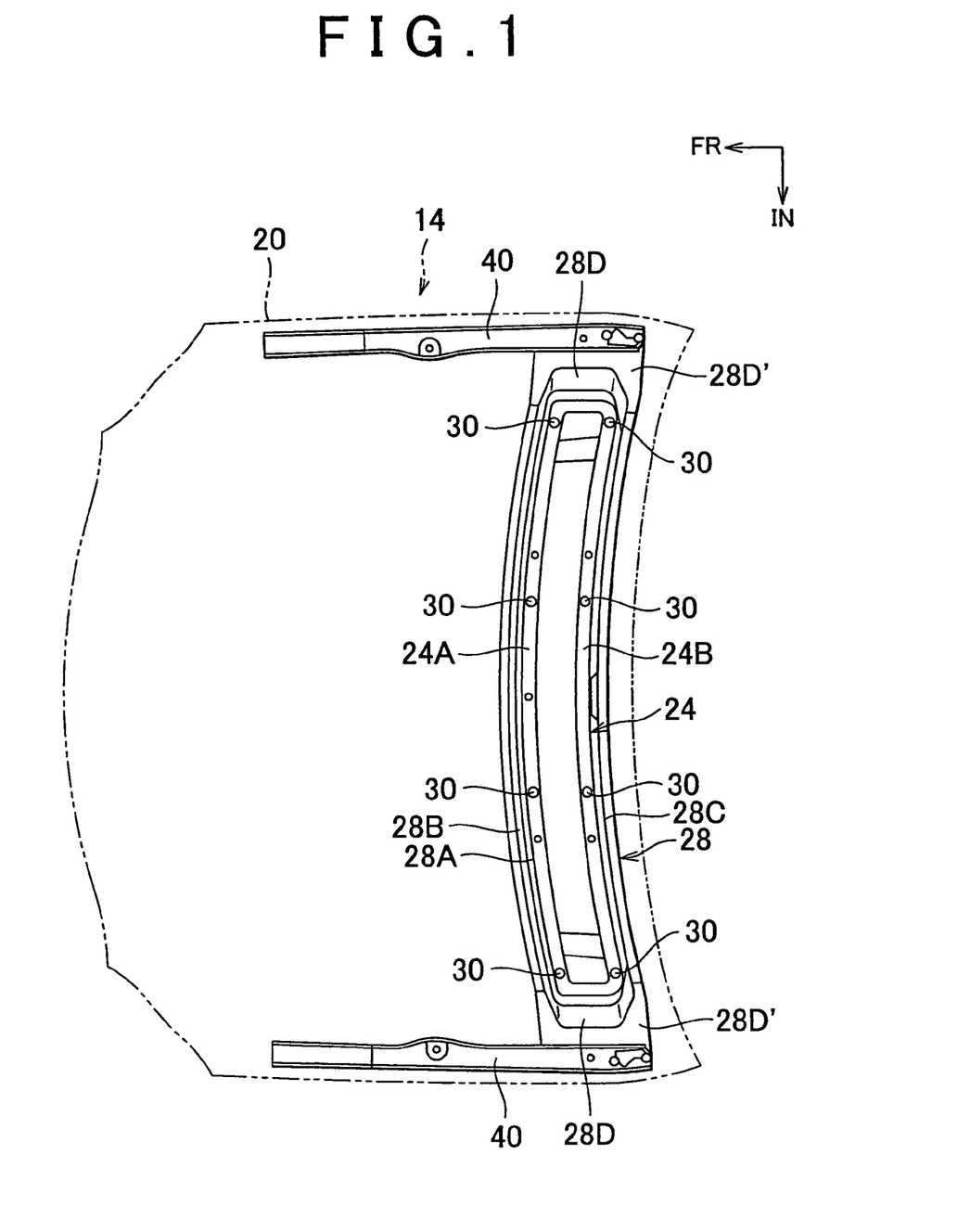
FIG. 1 is a bottom view of a hood showing a major part of a hood airbag device in accordance with a first preferred embodiment of the present invention.

The bottom wall portion 28A has an aperture 29 that is about the same size as the internal hood aperture 26. The airbag case 46 can be inserted through the aperture 29. Each of the front and rear wall portions 28B and 28C has a vertical cross-section of a generally "Z"-like shape and extends across the space 31 between the inner hood panel 20 and the outer hood panel 16.

The in-hood reinforcement 28 and the lower plate 24 are jointly fastened to the inner hood panel 20 by means of a fastener means, e.g., bolts 30 and weld nuts 32, under the state that the bottom wall portion 28A of the in-hood reinforcement 28 makes contact with the periphery around the internal hood aperture 26 of the inner hood panel 20. The weld nuts 32 are pre-welded to the top surface of the bottom wall portion 28A of the in-hood reinforcement 28. This means that the bolts 30 are tightened (inserted) from below the inner hood panel 20. The front wall portion 28B, the rear wall portion 28C and the side wall portions 28D of the in-hood reinforcement 28 are bent outwardly at their top edges to form a flange portion. The flange portion is bonded to the back surface of the outer hood panel 16 by means of a fixture means such as an adhesive agent (e.g., mastic) 36.

One of the reasons for providing the in-hood reinforcement 28 is to compensate for the reduced rigidity of the inner hood panel 20 caused by the formation of the internal hood aperture 26, and another reason is to fixedly secure the airbag module 22 in a closed space (the space 31) of the hood 14 defined by the outer hood panel 16 and the inner hood panel 20.

In the meantime, the bag-expansion opening 18 of the outer hood panel 16, facing the open end of the airbag case 46, is openably closed by a metallic airbag door 48. Specifically, the bag-expansion opening 18 is formed in a recessed portion 50 of the outer hood panel 16 downwardly recessed from the general surface 16A of the outer hood panel 16. The airbag door 48 has a thickness and size enough to be received in the stepped-down portion 50. An extensible hinge 48B is integrally formed with a rear end portion 48A of the airbag door 48, the extensible hinge 48B and the rear end portion 48A being of a generally arch shape. Although the airbag door 48 is made of metal in this embodiment, it may be formed of resin or may be a two-layered structure comprised of a metallic base panel and a resin layer overlaid on the base panel.

More than one extensible hinge 48B may be provided and they may be located at regular intervals along the width direction of the airbag door 48. In a corresponding relationship with the extensible hinges 48B, brackets 52 are fixedly secured to the rear wall portion 28C of the in-hood reinforcement 28 at positions corresponding to the extensible hinges 48B. The extensible hinge 48B has a lower end portion 48B1 fixed to the corresponding bracket 52 by means of a bolt 54 and a nut 56. Accordingly, if the vehicle collides with an impact object at its front area, the airbag door 48 is unfolded toward the rear side of the vehicle by the force of the inflating airbag 60 about the fastening point of the bolt 54 and the nut 56, while plastically deforming the generally C-shaped central portion 48B2 of the extensible hinge 48B.

In this embodiment, as illustrated in FIG. 1 (a bottom view of the hood 14), a pair of left and right flange portions 28D' protruding in the hood width direction is formed on the end portions (on the side of the bottom wall of the inner hood panel 20) of the left and right side wall portions 28D located at the longitudinal opposite ends of the in-hood reinforcement 28. The left and right flange portions 28D' are respectively fixed to a left and right hood hinge reinforcements 40 disposed at opposite lateral sides of the inner hood panel 20 and extending in the longitudinal direction of the hood 14. This allows the in-hood reinforcement 28 to be structurally combined with the hood hinge reinforcements 40.

Each of the hood hinge reinforcements 40 is an elongated member for reinforcing the area to which a hood hinge is attached, and has a general U-shape in cross-section. Furthermore, each of the hood hinge reinforcements 40 is a member of high strength and high rigidity disposed at the opposite lateral ends of the inner hood panel 20 and extending in the longitudinal direction of the hood 14. In addition, each of the hood hinge reinforcements 40 can be fastened to the inner hood panel by using, for example, bolts and nuts. The fixing method is not restricted to this but may include other fixing methods such as welding and the like.

The bottom wall portion 28A of the in-hood reinforcement 28, the lower plate 24 and the peripheral edge portion 42 around the internal hood aperture 26 of the inner hood panel 20 are overlaid one below another in three layers as shown in FIG. 2. In this regard, the lower plate 24 is integrated with the bottom wall 46D of the airbag case 46 and serves as a part of the latter. Under the overlaid condition, the bolts 30 are threaded into the weld nuts 32 from below the hood 14, thereby making the airbag case 46 be integrated with the in-hood reinforcement 28.

In other words, in this embodiment, the elongated in-hood reinforcement 28 extending in the hood width direction is combined with the pair of left and right hood hinge reinforcements 40. Furthermore, the airbag case 46, whose long side extends in the hood width direction, is fixedly fastened to the in-hood reinforcement 28 and also to the peripheral edge portion 42 around the internal hood aperture 26 of the inner hood panel 20 by means of a fastener means.

Next, description will be given to an operation and effect of the hood airbag device of the first embodiment.

In the event that the vehicle 12 makes a head-on collision with an impact object, e.g. a pedestrian, the inflator 58 is actuated to discharge a gas through the gas emission holes. This inflates the airbag 60, stored within the airbag case 46 in a collapsed condition, so that the airbag 60 presses upon the bottom of the airbag door 48. If the inflating pressure exerted on the airbag door 48 reaches a predetermined value, the airbag door 48 is unfolded outside the hood 14 (toward the windshield 64) about the extensible hinge 48B, so that the bag-expansion opening 18 formed at the rear side of the hood 14 is opened and, as illustrated in FIG. 4, the airbag 60 is expanded and deployed into a generally "U"-like shape as viewed from above. As a consequence, the impact object lands from above the hood 14 on the main portion 60A or the extension portions 60B of the airbag 60 thus expanded and deployed. This ensures that the impact energy at the time of collision is absorbed by the airbag 60, thus reducing the reaction force of the vehicle body applied to the impact object.

In the hood airbag device 10 of this embodiment, the airbag case 46 is inserted and mounted in place through the internal hood aperture 26 formed at the rear side of the inner hood panel 20 in the hood width direction. This may reduce the rigidity of the inner hood panel 20 around the internal hood aperture 26. For this reason, the in-hood reinforcement 28 is arranged around the airbag case 46 in an effort to reinforce the surrounding area, including the peripheral edge portion 42 around the internal hood aperture 26 of the inner hood panel 20. Particularly, in this embodiment, the flange portions 28D' are provided on the pair of left and right side wall portions 28D, namely the longitudinal opposite end portions of the in-hood reinforcement 28, and are attached to rear end portions in the vehicular longitudinal direction of the pair of left and right hood hinge reinforcements 40 disposed at the opposite lateral sides of the inner hood panel 20. Thus, the mass of the airbag module 22 is borne by the hood hinge reinforcements 40. In other words, the mass of the airbag module 22 is supported by the left and right hood hinge reinforcements 40.

Supplementarily stating in this respect, as set forth above, the hood hinge reinforcements 40 are members of high strength and high rigidity extending in the longitudinal direction of the hood 14 along the opposite sides of the inner hood panel 20. Combining the in-hood reinforcement 28 extending in the hood width direction with the pair of left and right hood hinge reinforcements 40 provides a frame of high rigidity united in a generally U-shape as viewed from above. By having this frame support the airbag module 22, the rigidity requirement in supporting the airbag module 22 can be fully complied with. This means that the load borne by the in-hood reinforcement 28 is reduced. In proportion to the reduction in load, it becomes possible to reduce the thickness of the in-hood reinforcement 28, which leads to weight saving of the in-hood reinforcement 28 and eventually the vehicle 12 as a whole. In addition, providing the frame of high rigidity united in the generally U-shape as viewed from above helps to enhance the torsional rigidity of the hood 14. From this point of view, the present invention conceptualized in this embodiment may be directed to such reinforcement structure per se.

Moreover, inasmuch as the hood hinge reinforcements 40 are originally arranged on the hood 14, it is possible to relatively readily provide the reinforcement structure merely by coupling the in-hood reinforcement 28 to the existing hood hinge reinforcements 40.

As described above, in accordance with this embodiment, it is possible to assure the rigidity of the inner hood panel 20 with ease, in case where the internal hood aperture 26 extending in the lateral direction of the vehicle is formed in the inner hood panel 20 and then the airbag module 22 is mounted through the internal hood aperture 26 (from below the hood 14).

Further, in this embodiment, because the elongated airbag case 46 extending in the hood width direction is fixed to the in-hood reinforcement 28, the airbag case 46, the in-hood reinforcement 28 and the hood hinge reinforcements 40 are united together. That is, the airbag case 46 is also used as a reinforcing member. Accordingly, the rigidity of the airbag case 46 is effectively utilized. Consequently, in accordance with this embodiment, the rigidity of the inner hood panel 20 can be secured without increasing the number of components.

Figure 5:
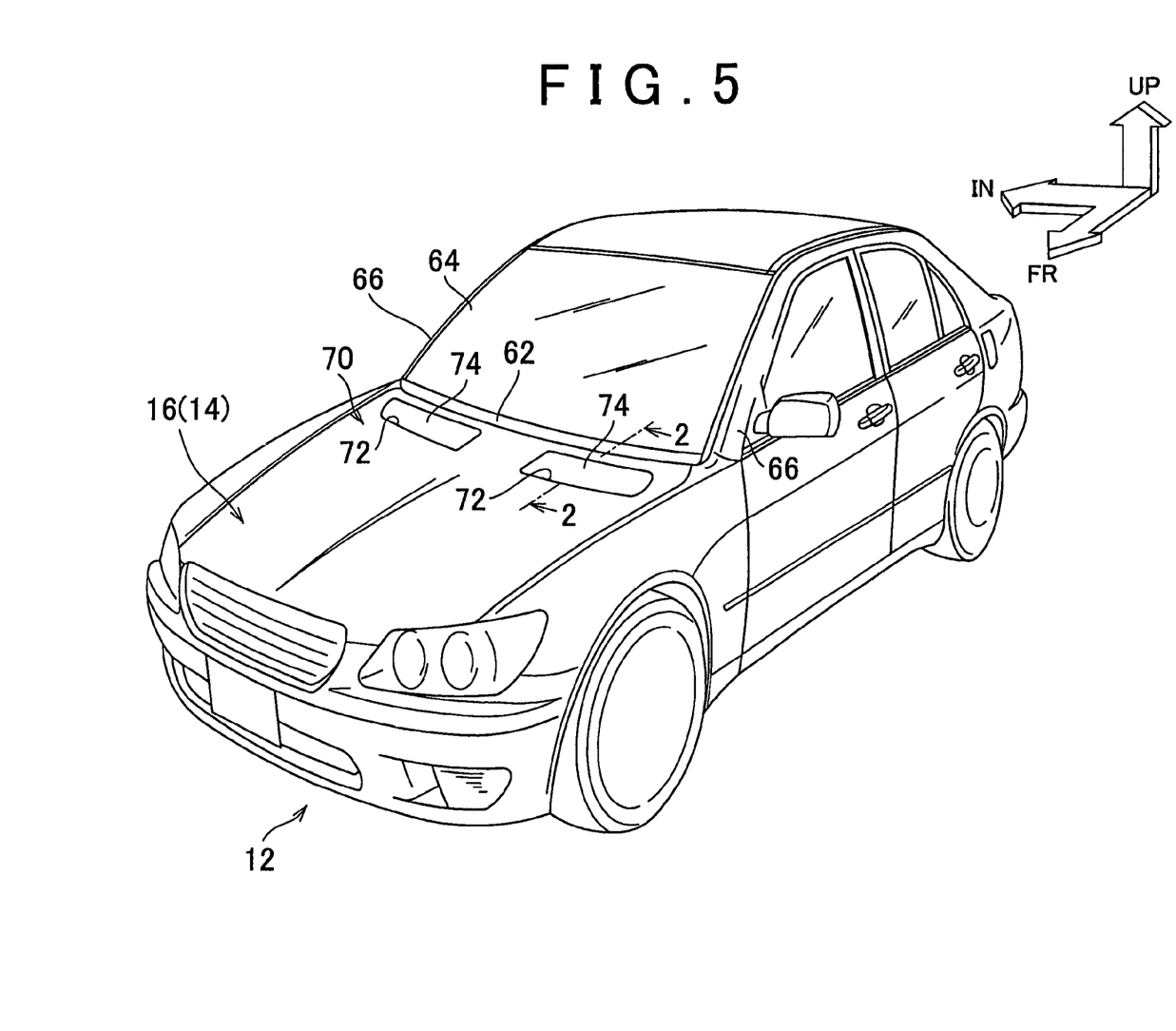
FIG. 5 is a perspective view of a vehicle depicting a hood airbag device of a second preferred embodiment of the present invention in an inactive state, which corresponds to FIG. 3.
Figure 6:
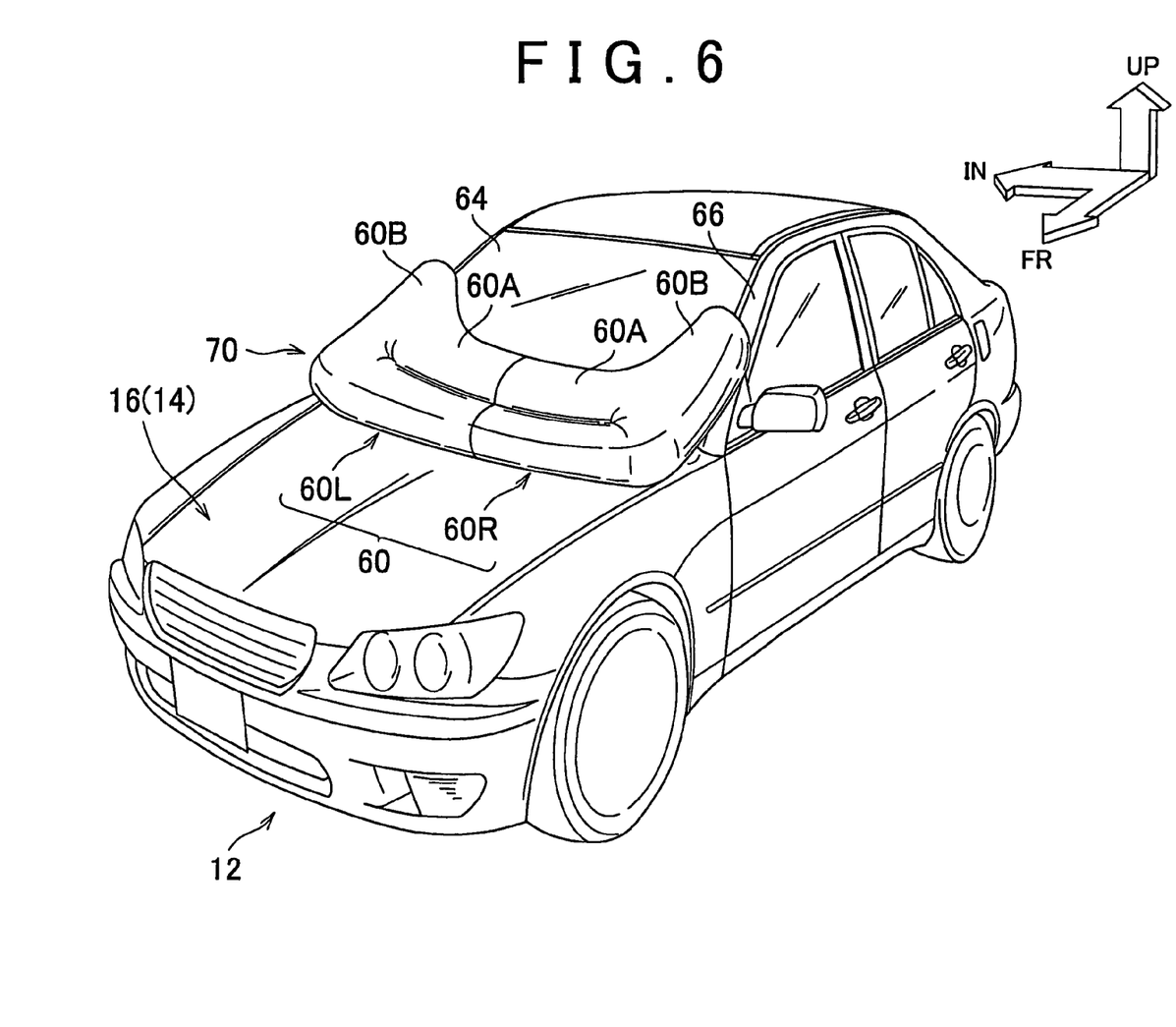
FIG. 6 is a perspective view of the vehicle illustrating the hood airbag device of the second embodiment in an activated state, which corresponds to FIG. 4.

Hereinafter, a hood airbag device in accordance with a second embodiment of the present invention will be described with reference to FIGS. 5 and 6. The same parts or components as those in the first embodiment described above will be designated by like reference numerals, and descriptions thereon will be omitted.

The hood airbag device 70 of the second embodiment is characterized in that the airbag 60 is divided into left and right airbags. More specifically, as shown in FIG. 5, a pair of left and right bag-expansion openings 72 are formed at both sides of the rear end portion of the outer hood panel 16, and each of the bag-expansion openings 72 is openably closed by an airbag door 74. As can be seen in FIG. 6, the airbag 60 includes a left airbag 60L and a right airbag 60R. The left airbag 60L is adapted to be deployed from the left bag-expansion opening 72 as viewed from the front side of the vehicle, while the right airbag 60R is adapted to be deployed from the right bag-expansion opening 72 as viewed from the front side of the vehicle. Two airbag modules 22 are provided in a one-to-one relationship with the left airbag 60L and the right airbag 60R (This is not the case for the airbag case 46).

The airbag modules 22 are respectively provided at the left-hand side and the right-hand side as noted just above, but the airbag case 46 is the same as that of the first embodiment. In other words, a left and right inflators 58 and corresponding left and right airbags 60L and 60R are accommodated in one airbag case 46. Because the airbag case 46 of the first embodiment may be employed, the in-hood reinforcement 28 is also totally the same as the one used in the first embodiment. Thus, the most important feature in the hood airbag device 70 of the second embodiment resides in that the same reinforcement structure as that of the first embodiment is applicable thereto. By combining the longitudinal opposite ends of the in-hood reinforcement 28 with the left and right hood hinge reinforcements 40 and fastening the airbag case 46 to the in-hood reinforcement 28 by means of the bolts 30 and the weld nuts 32, it becomes possible to use the three members, namely, the hood hinge reinforcements 40, the in-hood reinforcement 28 and the airbag case 46 as one integral reinforcing frame.

With the arrangement described above, the reinforcement structure that enhances the rigidity of the hood 14 using the left and right hood hinge reinforcements 40 can be equally applied to either the case where the single non-divided airbag 60 is employed as in the hood airbag device 10 of the first embodiment or the case where the left and right airbags 60L and 60R are employed as in the hood airbag device 70 of the second embodiment. In other words, the reinforcement structure can be used in common in either type of the airbags. This eliminates the need to change the design of the hood airbag device on a vehicle-by-vehicle basis, which helps to reduce cost.

In the second embodiment set forth above, the inflators 58 are divided into left and right ones to correspond to the left and right airbags 60L and 60R. However, the present invention is not limited thereto and a single inflator may be provided at the center of the airbag case 46, in which case the gas may be supplied to the left and right airbags 60L and 60R through gas supply lines such as hoses or the like.

Furthermore, although the in-hood reinforcement 28 employed in the first and second embodiments described above is of an elongated box-like shape as viewed from above, the in-hood reinforcement may be divided into two front and rear reinforcements, each of which has longitudinal opposite ends combined with the left and right hood hinge reinforcements 40. Such an arrangement is also capable of providing a certain level of rigidity improvement and therefore has no problem in application. It should be noted that this alternative arrangement falls within the scope of the present invention.

Moreover, in the foregoing embodiments, e.g. in the first embodiment described above, the airbag 60 is configured, when expanded and deployed, to cover the lower end portion of the windshield 64 and the lower areas of the front pillars 66, as well as the rear end portion 14A of the hood 14 and the cowl 62. Alternatively, the airbag 60 may be configured to cover at least the rear end portion 14A of the hood 14 (the rear end portion 16A of the outer hood panel 16) and the cowl 62.

While the invention has been shown and described with respect to the preferred embodiments, it will be understood by those skilled in the art that various changes and modification may be made without departing from the scope of the invention as defined in the following claims.

The invention claimed is:

1. A hood airbag device for use in a vehicle, comprising:
   an airbag case accommodating therein a gas generating unit that discharges a gas when the vehicle collides with an impact object and an airbag adapted to be deployed over an outer hood panel by the gas supplied from the gas generating unit, wherein the airbag case is capable of being inserted from below an inner hood panel and mounted in place through a mounting aperture formed at a rear side of the inner hood panel and formed along a hood width direction; and
   an in-hood reinforcement, arranged around the airbag case, and connected to the outer hood panel and the periphery around the mounting aperture of the inner hood panel to reinforce a peripheral portion around the mounting aperture of the inner hood panel, in which longitudinal opposite end portions of the in-hood reinforcement are respectively coupled to hood hinge reinforcements disposed at opposite lateral sides of the inner hood panel.

2. The hood airbag device according to claim 1, wherein the airbag case is fixed to the in-hood reinforcement and has an elongated shape that extends in the hood width direction.

3. The hood airbag device according to claim 1, wherein a single bag-expansion opening is formed at a rear end portion of the outer hood panel that extends in the hood width direction, and wherein the airbag is a unitary non-divided airbag and is deployed to the outside through the bag-expansion opening.

4. The hood airbag device according to claim 1, wherein a left and right bag-expansion opening are formed at a rear end portion of the outer hood panel, each extending in the hood width direction, and wherein the airbag is divided into left and right airbags to correspond to the left and right bag-expansion openings, each of the left and right airbags is deployed to the outside through the corresponding one of the left and right bag-expansion openings.

5. The hood airbag device according to claim 1, wherein the in-hood reinforcement has a bottom wall portion disposed around the mounting aperture in a contacting relationship with the inner hood panel, a pair of front and rear wall portions extending upwardly from the front and rear edges of the bottom wall portion, and a pair of left and right side wall portions.

6. The hood airbag device according to claim 5, wherein the bottom wall portion has an aperture that is substantially same size as the mounting aperture.

7. The hood airbag device according to claim 5, wherein left and right flange portions protruding in the hood width direction is formed on the end portions of the left and right side wall portions, and the wall portions are attached to the pair of left and right hood hinge reinforcements.

8. The hood airbag device according to claim 1, wherein the hood hinge reinforcement is disposed at the opposite lateral ends of the inner hood panel and extending in the longitudinal direction of the hood.

9. The hood airbag device according to claim 1, wherein the longitudinal opposite end portions of the in-hood reinforcement are respectively coupled to rear end portions in the vehicular longitudinal direction of the hood hinge reinforcements.

10. The hood airbag device according to claim 1, wherein the hood airbag device further comprises an airbag module including:
   the airbag case, wherein the airbag case has a box shape; and
   a lower plate which is larger than the mounting aperture of the inner hood panel, has high strength, and is fixed to a bottom wall of the airbag case,
   wherein the airbag module is fixed to the inner hood panel and the in-hood reinforcement via the lower plate contacting with the periphery around the mounting aperture of the inner hood panel.

11. The hood airbag device according to claim 1, wherein the in-hood reinforcement extends across a space between the inner hood panel and the outer hood panel.

12. The hood airbag device according to claim 1, wherein the airbag case is inserted through an aperture that is formed on the in-hood reinforcement.

13. The hood airbag device according to claim 10, wherein the lower plate closes the mounting aperture of the inner hood panel.

* * * * *